(12) United States Patent
Gupta et al.

(10) Patent No.: US 9,007,958 B2
(45) Date of Patent: Apr. 14, 2015

(54) EXTERNAL LOOP DETECTION FOR AN ETHERNET FABRIC SWITCH

(75) Inventors: Amit Gupta, Fremont, CA (US); Tse Yu Lei, San Jose, CA (US); Chi Lung Chong, Fremont, CA (US); Mythilikanth Raman, San Jose, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 255 days.

(21) Appl. No.: 13/484,072

(22) Filed: May 30, 2012

(65) Prior Publication Data

US 2013/0003601 A1 Jan. 3, 2013

Related U.S. Application Data

(60) Provisional application No. 61/502,792, filed on Jun. 29, 2011.

(51) Int. Cl.
*H04L 12/705* (2013.01)
*H04L 12/713* (2013.01)
*H04L 12/28* (2006.01)
*H04L 12/46* (2006.01)

(52) U.S. Cl.
CPC ............. *H04L 12/462* (2013.01); *H04L 45/18* (2013.01); *H04L 45/586* (2013.01)

(58) Field of Classification Search
CPC ....................................................... H04L 12/28
See application file for complete search history.

(56) References Cited

U.S. PATENT DOCUMENTS

| | | | |
|---|---|---|---|
| 5,390,173 | A | 2/1995 | Spinney |
| 5,802,278 | A | 9/1998 | Isfeld |
| 5,983,278 | A | 11/1999 | Chong |
| 6,041,042 | A | 3/2000 | Bussiere |
| 6,085,238 | A | 7/2000 | Yuasa |
| 6,104,696 | A | 8/2000 | Kadambi |
| 6,185,241 | B1 | 2/2001 | Sun |

(Continued)

FOREIGN PATENT DOCUMENTS

| | | |
|---|---|---|
| CN | 102801599 | 11/2012 |
| EP | 1916807 A2 | 4/2008 |

(Continued)

OTHER PUBLICATIONS

"Switched Virtual Internetworking moved beyond bridges and routers", 8178 Data Communications 23(Sep. 1994), No. 12, New York.

(Continued)

*Primary Examiner* — Jianye Wu
(74) *Attorney, Agent, or Firm* — Shun Yao; Park, Vaughan, Fleming & Dowler LLP

(57) ABSTRACT

One embodiment of the present invention provides a switch. The switch includes a local identifier associated with the switch, a receiving interface, a loop detection mechanism, and an interface control mechanism. The receiving interface identifies a loop-detection frame which includes an identifier associated with originating switch of the frame. The loop detection mechanism detects a loop based on a match of the identifier associated with the originating switch and the local identifier. The interface control mechanism is coupled to the loop detection mechanism and precludes, in response to detecting a loop, the receiving interface from forwarding frames corresponding to the loop.

27 Claims, 10 Drawing Sheets

(56) References Cited

U.S. PATENT DOCUMENTS

| | | |
|---|---|---|
| 6,438,106 B1 | 8/2002 | Pillar |
| 6,542,266 B1 | 4/2003 | Phillips |
| 6,633,761 B1 | 10/2003 | Singhal |
| 6,873,602 B1 | 3/2005 | Ambe |
| 6,975,581 B1 | 12/2005 | Medina |
| 6,975,864 B2 | 12/2005 | Singhal |
| 7,016,352 B1 | 3/2006 | Chow |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,330,897 B2 | 2/2008 | Baldwin |
| 7,380,025 B1 | 5/2008 | Riggins |
| 7,430,164 B2 * | 9/2008 | Bare .......................... 370/217 |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,960 B1 | 3/2010 | Aubuchon |
| 7,690,040 B2 | 3/2010 | Frattura |
| 7,716,370 B1 | 5/2010 | Devarapalli |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,949,638 B1 | 5/2011 | Goodson |
| 7,957,386 B1 | 6/2011 | Aggarwal |
| 8,027,354 B1 | 9/2011 | Portolani |
| 8,054,832 B1 | 11/2011 | Shukla |
| 8,078,704 B2 | 12/2011 | Lee |
| 8,102,781 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,301,686 B1 | 10/2012 | Appajodu |
| 8,351,352 B1 | 1/2013 | Eastlake, III |
| 8,369,347 B2 | 2/2013 | Xiong |
| 8,392,496 B2 | 3/2013 | Linden |
| 8,462,774 B2 | 6/2013 | Page |
| 8,520,595 B2 | 8/2013 | Yadav |
| 8,599,850 B2 | 12/2013 | Jha |
| 2002/0021701 A1 | 2/2002 | Lavian |
| 2002/0091795 A1 | 7/2002 | Yip |
| 2003/0041085 A1 | 2/2003 | Sato |
| 2003/0123393 A1 | 7/2003 | Feuerstraeter |
| 2003/0174706 A1 | 9/2003 | Shankar |
| 2003/0189905 A1 | 10/2003 | Lee |
| 2004/0001433 A1 | 1/2004 | Gram |
| 2004/0010600 A1 | 1/2004 | Baldwin |
| 2004/0117508 A1 | 6/2004 | Shimizu |
| 2004/0120326 A1 | 6/2004 | Yoon |
| 2004/0165595 A1 | 8/2004 | Holmgren |
| 2004/0213232 A1 | 10/2004 | Regan |
| 2005/0007951 A1 | 1/2005 | Lapuh |
| 2005/0044199 A1 | 2/2005 | Shiga |
| 2005/0094568 A1 | 5/2005 | Judd |
| 2005/0094630 A1 | 5/2005 | Valdevit |
| 2005/0122979 A1 | 6/2005 | Gross |
| 2005/0169188 A1 | 8/2005 | Cometto |
| 2005/0195813 A1 | 9/2005 | Ambe |
| 2005/0213561 A1 | 9/2005 | Yao |
| 2005/0265356 A1 | 12/2005 | Kawarai |
| 2005/0278565 A1 | 12/2005 | Frattura |
| 2006/0002370 A1 * | 1/2006 | Rabie et al. .................. 370/351 |
| 2006/0018302 A1 | 1/2006 | Ivaldi |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0251067 A1 | 11/2006 | Desanti |
| 2006/0256767 A1 | 11/2006 | Suzuki |
| 2006/0265515 A1 | 11/2006 | Shiga |
| 2006/0285499 A1 * | 12/2006 | Tzeng .......................... 370/249 |
| 2007/0036178 A1 | 2/2007 | Hares |
| 2007/0097968 A1 | 5/2007 | Du |
| 2007/0116224 A1 | 5/2007 | Burke |
| 2007/0177597 A1 | 8/2007 | Ju |
| 2007/0274234 A1 | 11/2007 | Kubota |
| 2007/0289017 A1 | 12/2007 | Copeland, III |
| 2008/0052487 A1 | 2/2008 | Akahane |
| 2008/0065760 A1 | 3/2008 | Damm |
| 2008/0080517 A1 | 4/2008 | Roy |
| 2008/0101386 A1 | 5/2008 | Gray |
| 2008/0133760 A1 | 6/2008 | Berkvens et al. |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0186981 A1 | 8/2008 | Seto |
| 2008/0205377 A1 | 8/2008 | Chao |
| 2008/0219172 A1 | 9/2008 | Mohan |
| 2008/0225853 A1 | 9/2008 | Melman |
| 2008/0240129 A1 | 10/2008 | Elmeleegy |
| 2008/0267179 A1 | 10/2008 | Lavigne |
| 2008/0285555 A1 | 11/2008 | Ogasahara |
| 2008/0298248 A1 | 12/2008 | Roeck |
| 2009/0037607 A1 | 2/2009 | Farinacci |
| 2009/0044270 A1 | 2/2009 | Shelly |
| 2009/0067422 A1 | 3/2009 | Poppe |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0106405 A1 | 4/2009 | Mazarick |
| 2009/0116381 A1 | 5/2009 | Kanda |
| 2009/0138752 A1 | 5/2009 | Graham |
| 2009/0199177 A1 | 8/2009 | Edwards |
| 2009/0204965 A1 | 8/2009 | Tanaka |
| 2009/0222879 A1 | 9/2009 | Kostal |
| 2009/0245137 A1 | 10/2009 | Hares |
| 2009/0245242 A1 | 10/2009 | Carlson |
| 2009/0260083 A1 | 10/2009 | Szeto |
| 2009/0323708 A1 | 12/2009 | Ihle |
| 2009/0327392 A1 | 12/2009 | Tripathi |
| 2009/0327462 A1 | 12/2009 | Adams |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |

(56) References Cited

U.S. PATENT DOCUMENTS

| | | |
|---|---|---|
| 2010/0165877 A1 | 7/2010 | Shukla |
| 2010/0165995 A1 | 7/2010 | Mehta |
| 2010/0169467 A1 | 7/2010 | Shukla |
| 2010/0169948 A1 | 7/2010 | Budko |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2011/0019678 A1 | 1/2011 | Mehta |
| 2011/0035498 A1 | 2/2011 | Shah |
| 2011/0044339 A1 | 2/2011 | Kotalwar |
| 2011/0064086 A1 | 3/2011 | Xiong |
| 2011/0072208 A1 | 3/2011 | Gulati |
| 2011/0085560 A1 | 4/2011 | Chawla |
| 2011/0085563 A1 | 4/2011 | Kotha |
| 2011/0134802 A1 | 6/2011 | Rajagopalan |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161695 A1 | 6/2011 | Okita |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0274114 A1 | 11/2011 | Dhar |
| 2011/0286457 A1 | 11/2011 | Ee |
| 2011/0296052 A1 | 12/2011 | Guo |
| 2011/0299391 A1 | 12/2011 | Vobbilisetty |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299536 A1 | 12/2011 | Cheng |
| 2012/0011240 A1 | 1/2012 | Hara |
| 2012/0014261 A1 | 1/2012 | Salam |
| 2012/0014387 A1 | 1/2012 | Dunbar |
| 2012/0027017 A1 | 2/2012 | Rai |
| 2012/0033663 A1 | 2/2012 | Guichard |
| 2012/0033665 A1 | 2/2012 | Silva |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0163164 A1 | 6/2012 | Terry |
| 2012/0177039 A1 | 7/2012 | Berman |
| 2012/0243539 A1 | 9/2012 | Keesara |
| 2012/0294192 A1 | 11/2012 | Masood |
| 2012/0320800 A1 | 12/2012 | Kamble |
| 2013/0034015 A1 | 2/2013 | Jaiswal |
| 2013/0067466 A1 | 3/2013 | Combs |
| 2013/0259037 A1 | 10/2013 | Natarajan |
| 2014/0105034 A1* | 4/2014 | Sun .............................. 370/249 |

FOREIGN PATENT DOCUMENTS

| | | |
|---|---|---|
| EP | 2001167 A1 | 12/2008 |
| WO | 2010111142 A1 | 9/2010 |

OTHER PUBLICATIONS

S. Night et al., "Virtual Router Redundancy Protocol", Network Working Group, XP-002135272, Apr. 1998.

Eastlake 3rd., Donald et al., "RBridges: TRILL Header Options", Draft-ietf-trill-rbridge-options-00.txt, Dec. 24, 2009.

J. Touch, et al., "Transparent Interconnection of Lots of Links (TRILL): Problem and Applicability Statement", May 2009.

Perlman, Radia et al., "RBridge VLAN Mapping", Draft-ietf-trill-rbridge-vlan-mapping-01.txt, Dec. 4, 2009.

Brocade Fabric OS (FOS) 6.2 Virtual Fabrics Feature Frequently Asked Questions.

Perlman, Radia "Challenges and Opportunities in the Design of TRILL: a Routed layer 2 Technology", XP-002649647, 2009.

Nadas, S. et al., "Virtual Router Redundancy Protocol (VRRP) Version 3 for IPv4 and IPv6", Mar. 2010.

Perlman, Radia et al., "RBridges: Base Protocol Specification", draft-ietf-trill-rbridge-protocol-16.txt, Mar. 3, 2010.

Christensen, M. et al., "Considerations for Internet Group Management Protocol (IGMP) and Multicast Listener Discovery (MLD) Snooping Switches", May 2006.

Lapuh, Roger et al., "Split Multi-link Trunking (SMLT)", Oct. 2002.

Lapuh, Roger et al., "Split Multi-link Trunking (SMLT) draft-lapuh-network-smlt-08", 2008.

Louati, Wajdi et al., "Network-Based Virtual Personal Overlay Networks Using Programmable Virtual Routers", 2005.

Knight, Paul et al., "Network based IP VPN Architecture using Virtual Routers", May 2003.

Kreeger, L. et al. "Network Virtualization Overlay Control Protocol Requirements draft-kreeger-nvo3-overlay-cp-00", Aug. 2, 2012.

An Introduction to Brocade VCS Fabric Technology, Dec. 3, 2012.

Knight, Paul et al. "Layer 2 and 3 Virtual Private Networks: Taxonomy, Technology, and Standardization Efforts", 2004.

Narten, T. et al. "Problem Statement: Overlays for Network Virtualization draft-narten-nvo3-overlay-problem-statement-01", Oct. 31, 2011.

The Effortless Network: HyperEdge Technology for the Campus LAN, 2012.

FastIron and Turbulron 24x Configuration Guide, 2010.

FastIron Configuration Guide, Supporting IronWare Software Release 07.0.00, 2009.

Foundary FastIron Configuration Guide, Software Release FSX 04.2.00b, Software Release FWS 04.3.00, Software Release FGS 05.0.00a, 2008.

Brocade Unveils "The Effortless Network", 2009.

Office Action for U.S. Appl. No. 12/725,249, filed Mar. 16, 2010, dated Sep. 12, 2012.

Office Action for U.S. Appl. No. 12/725,249, filed Mar. 16, 2010, dated Apr. 26, 2013.

Office Action for U.S. Appl. No. 13/087,239, filed Apr. 14, 2011, dated Dec. 5, 2012.

Office Action for U.S. Appl. No. 13/087,239, filed Apr. 14, 2011, dated May 22, 2013.

Office Action for U.S. Appl. No. 13/098,490, filed May 2, 2011, dated Dec. 21, 2012.

Office Action for U.S. Appl. No. 13/098,490, filed May 2, 2011, dated Jul. 9, 2013.

Office Action for U.S. Appl. No. 13/092,724, filed Apr. 22, 2011, dated May 2, 2013.

Office Action for U.S. Appl. No. 13/092,724, filed Apr. 22, 2011, dated Jul. 16, 2013.

Office Action for U.S. Appl. No. 13/092,580, filed Apr. 22, 2011, dated Jun. 10, 2013.

Office Action for U.S. Appl. No. 13/042,259, filed Mar. 7, 2011, dated Mar. 18, 2013.

Office Action for U.S. Appl. No. 13/092,460, filed Apr. 22, 2011, dated Jun. 21, 2013.

(56) References Cited

OTHER PUBLICATIONS

Office Action for U.S. Appl. No. 13/042,259, filed Mar. 7, 2011, dated Jul. 31, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,752, filed Apr. 22, 2011, dated Feb. 5, 2013.
Office Action for U.S. Appl. No. 13/092,752, filed Apr. 22, 2011, dated Jul. 18, 2013.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 12/950,968, filed Nov. 19, 2010, dated Jun. 7, 2012.
Office Action for U.S. Appl. No. 12/950,968, filed Nov. 19, 2010, dated Jan. 4, 2013.
Office Action for U.S. Appl. No. 13/092,864, filed Apr. 22, 2011, dated Sep. 19, 2012.
Office Action for U.S. Appl. No. 13/098,360, filed Apr. 29, 2011, dated May 31, 2013.
Office Action for U.S. Appl. No. 13/044,326, filed Mar. 9, 2011, dated Oct. 2, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/030,688, filed Feb. 18, 2011, dated Apr. 25, 2013.
Office Action for U.S. Appl. No. 13/044,301, filed Mar. 9, 2011, dated Jun. 11, 2013.
Office Action for U.S. Appl. No. 13/044,301, filed Mar. 9, 2011, dated Feb. 22, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/184,526, filed Jul. 16, 2011, dated Jan. 28, 2013.
Office Action for U.S. Appl. No. 13/184,526, filed May 22, 2013, dated May 22, 2013.
Office Action for U.S. Appl. No. 13/092,873, filed Apr. 22, 2011, dated Jun. 19, 2013.
Office Action for U.S. Appl. No. 13/365,993, filed Feb. 3, 2012, dated Jul. 23, 2013.
Office Action for U.S. Appl. No. 13/365,808, filed Feb. 3, 2012, dated Jul. 18, 2013.
Office Action for U.S. Appl. No. 13/312,903, filed Dec. 6, 2011, dated Jun. 13, 2013.
Office Action for U.S. Appl. No. 13/598,204, filed Aug. 29, 2012, dated Feb. 20, 2014.
Office Action for U.S. Appl. No. 13/533,843, filed Jun. 26, 2012, dated Oct. 21, 2013.
Office Action for U.S. Appl. No. 13/351,513, filed Jan. 17, 2012, dated Feb. 28, 2014.
Office Action for U.S. Appl. No. 13/425,238, filed Mar. 20, 2012, dated Mar. 6, 2014.
Office Action for U.S. Appl. No. 13/312,903, filed Dec. 6, 2011, dated Nov. 12, 2013.
Office Action for U.S. Appl. No. 13/092,873, filed Apr. 22, 2011, dated Nov. 29, 2013.
Office Action for U.S. Appl. No. 13/194,526, filed Jul. 16, 2011, dated Dec. 2, 2013.
Office Action for U.S. Appl. No. 13/092,460, filed Apr. 22, 2011, dated Mar. 14, 2014.
Office Action for U.S. Appl. No. 13/042,259, filed Mar. 7, 2011, dated Jan. 16, 2014.
Office Action for U.S. Appl. No. 13/092,580, filed Apr. 22, 2011, dated Jan. 10, 2014.
Office Action for U.S. Appl. No. 13/092,877, filed Apr. 22, 2011, dated Jan. 6, 2014.
"Switched Virtual Internetworking moves beyond bridges and routers", 23 (Sep. 1994), No. 12, New York, US.
Knight, S. et al. "Virtual Router Redundancy Protocol", Apr. 1998, XP-002135272.
Eastlake, Donald et al., "RBridges: TRILL Header Options", Dec. 2009.
Touch, J. et al., "Transparent Interconnection of Lots of Links (TRILL): Problem and Applicability Statement", May 2009.
Perlman, Radia et al., "RBridge VLAN Mapping", Dec. 2009.
"Brocade Fabric OS (FOS) 6.2 Virtual Fabrics Feature Frequently Asked Questions".
Perlman, Radia et al., "RBridges: Base Protocol Specification", Mar. 2010.
Zhai F. Hu et al. "RBridge: Pseudo-Nickname; draft-hu-trill-pseudonode-nickname-02.txt", May 15, 2012.
Huang, Nen-Fu et al., "An Effective Spanning Tree Algorithm for a Bridged LAN", Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.
Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.
Office Action dated Mar. 6, 2014, U.S. Appl. No. 13/425,238, filed Mar. 20, 2012.
Office Action dated Apr. 22, 2014, U.S. Appl. No. 13/030,806, filed Feb. 18, 2011.
Office Action dated Jun. 20, 2014, U.S. Appl. No. 13/092,877, filed Apr. 22, 2011.
Office Action dated Apr. 9, 2014, U.S. Appl. No. 13/092,752, filed Apr. 22, 2011.
Office Action dated Mar. 26, 2014, U.S. Appl. No. 13/092,701, filed Apr. 22, 2011.
Office Action dated Mar. 14, 2014, U.S. Appl. No. 13/092,460, filed Apr. 22, 2011.
Office Action dated Apr. 9, 2014, U.S. Appl. No. 13/092,724, filed Apr. 22, 2011.

* cited by examiner

EXTERNAL LOOP DETECTION FOR AN ETHERNET FABRIC SWITCH

RELATED APPLICATIONS

This application claims the benefit of U.S. Provisional Application No. 61/502,792, titled "Edge Loop Detection for Ethernet Fabrics/VCS Network," by inventors Amit Gupta, Jerry Lei, Chi Chong, Mythilikanth Raman, and Ram Singh, filed 29 Jun. 2011, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, the disclosure of which is incorporated by reference herein.

BACKGROUND

1. Field

The present disclosure relates to network management. More specifically, the present disclosure relates to a method and system for efficiently detecting an edge loop in a layer-2 network.

2. Related Art

The growth of the Internet has brought with it an increasing demand for bandwidth. As a result, equipment vendors race to build larger and faster switches, each capable of supporting a large number of end devices, to move more traffic efficiently. However, the size of a switch cannot grow infinitely. It is limited by physical space, power consumption, and design complexity, to name a few factors. One way to meet this challenge is to interconnect a number of switches to support a large number of users. Interconnecting such a large number of switches in a layer-3 network requires tedious and complex configurations on a respective switch, typically performed by a network administrator. Such configuration includes assigning an address for a respective interface and configuring routing protocols for the switch. These issues can be solved by interconnecting switches via layer-2.

As layer-2 (e.g., Ethernet) switching technologies continue to evolve, more routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While layer-2 connectivity brings many desirable features to a network, some issues remain unsolved for efficient external loop detection.

SUMMARY

One embodiment of the present invention provides a switch. The switch includes a local identifier associated with the switch, a receiving interface, a loop detection mechanism, and an interface control mechanism. The receiving interface identifies a loop-detection frame which includes an identifier associated with originating switch of the frame. The loop detection mechanism detects a loop based on a match of the identifier associated with the originating switch and the local identifier. The interface control mechanism is coupled to the loop detection mechanism and precludes, in response to detecting a loop, the receiving interface from forwarding frames corresponding to the loop.

In a variation on this embodiment, the originating switch is a remote switch, wherein the switch and the remote switch are members of an Ethernet fabric switch.

In a variation on this embodiment, the identifier associated with the originating switch identifies an Ethernet fabric switch.

In a variation on this embodiment, the identifier associated with the originating switch is a layer-2 multicast network address.

In a variation on this embodiment, the interface control mechanism also compares a priority value associated with the receiving interface and a priority value associated with an originating interface indicated by the frame.

In a variation on this embodiment, the receiving interface also identifies an originating interface for the frame based on a Transparent Interconnection of Lots of Links (TRILL) routing bridge (RBridge) identifier and an interface identifier.

In a variation on this embodiment, the loop-detection frame also contains an identifier of a virtual local area network (VLAN), and the detected loop is specific to the VLAN.

In a variation on this embodiment, the loop detection mechanism also maintains a counter which indicates a number of times the loop-detection frame has been identified, and the interface control mechanism precludes the receiving interface from forwarding frames corresponding to the loop further in response to a value of the counter exceeding a threshold value.

In a variation on this embodiment, also includes a logical switch management mechanism which maintains a membership in a logical switch, wherein the logical switch is configured to accommodate a plurality of switches and operates as a single logical switch.

DETAILED DESCRIPTION

Figure 1:
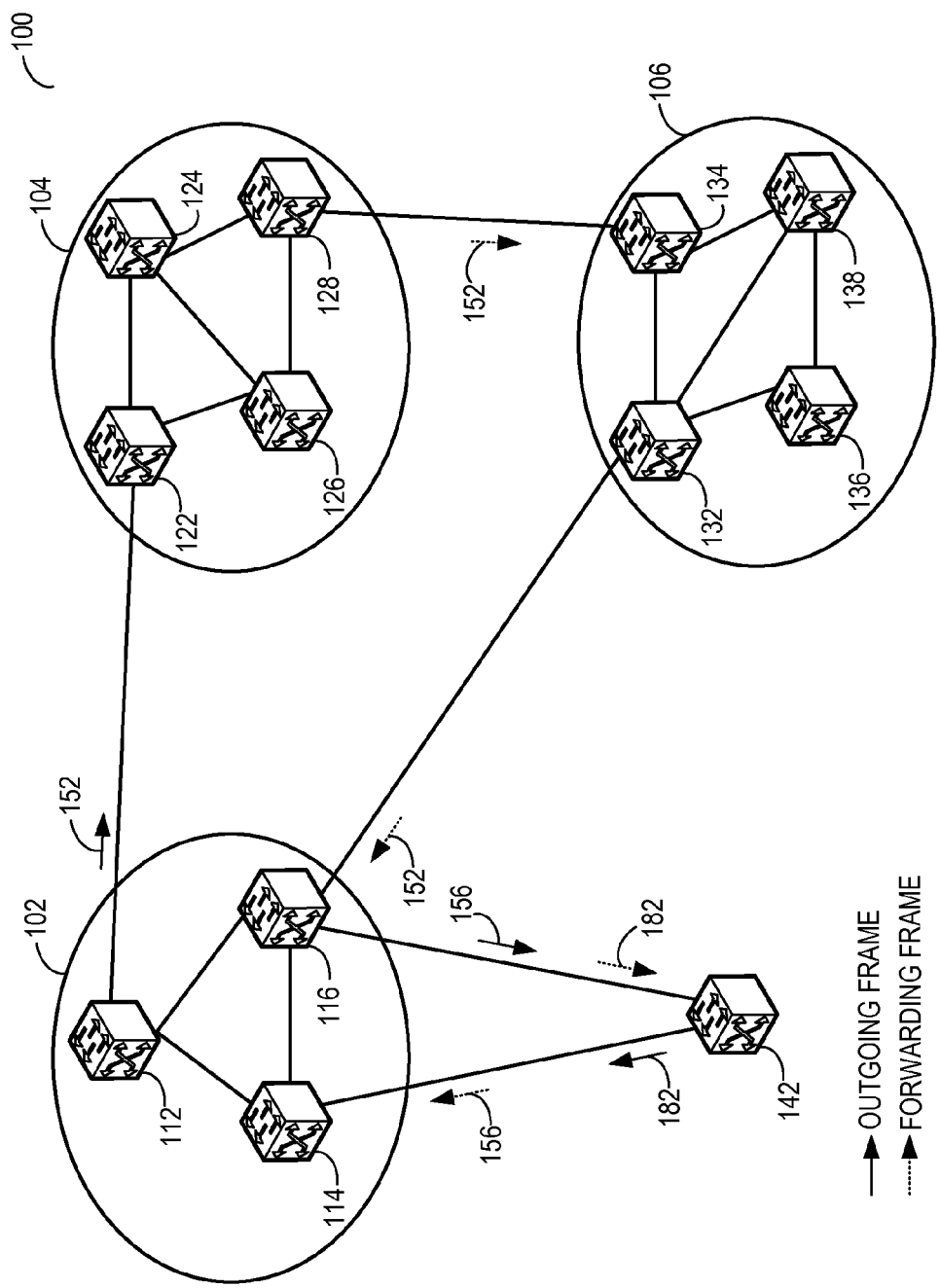
FIG. 1 illustrates detecting and breaking external loops in an exemplary network, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of detecting and breaking external loops in a layer-2 network is solved by enabling a (fabric) switch to identify a loop-detection frame sent from the switch. In a network, networking devices (e.g., switches and routers) are typically coupled to each other based on layer-2 and/or layer-3 protocols. Designing and provisioning a layer-3 network (e.g., an IP network) is complex because a respective layer-3 networking device (e.g., a router) requires individual configurations, such as address assignment for a respective interface in the device, and routing protocol selection and configuration. For a large and dynamic network, in which the network topology often changes due to addition of new networking devices, new links, new services, etc., configuring individual networking devices can be complex and tedious. Consequently, plug-and-play services are difficult to incorporate in such a network. On the other hand, a layer-2 network (e.g., an Ethernet network) can more readily facilitate plug-and-play services. A typical layer-2 switching protocol does not require complex configurations. Because a respective interface on a layer-2 switch has a default layer-2 network address (e.g., a media access control (MAC) address), the interface does not require any address configuration. Furthermore, layer-2 switching does not rewrite the layer-2 header of a packet, resulting in a lighter load on hardware and a better performance.

However, when three or more switches are coupled in a layer-2 network, there can be layer-2 external loops (i.e., loops created by external connectivity of a switch) between these switches. For example, if one or more of these switches are fabric switches, these external loops are created based on how one or more member switches of a fabric switch are coupled to external networking devices and not relevant to internal connectivity of these fabric switches. Typically the layer-2 network can have unicast, multicast, and broadcast frames. A switch transmits a broadcast or multicast frame via multiple interfaces except the receiving interface. In addition, the switch forwards a unicast frame with an unknown destination address via multiple interfaces (referred to as flooding) except the receiving interface, to ensure that the frame reaches the destination. When such a frame reaches a second switch, the second switch repeats the same. If there is a loop in the network, the frame traverses through multiple switches along the loop and eventually returns back to the originating switch. The switch repeats the action again and the frame continues to circulate the network in a loop. This results in a broadcast storm of data traffic in the layer-2 domain.

To solve this problem, a switch can identify a frame received by a local interface to be originated from the switch. If there is a loop in a network, a layer-2 frame eventually returns to the originating switch before a broadcast storm congests the network. If the originating switch can identify the frame, the switch can detect the loop and stop receiving frames from the interface to break the loop by shutting down the receiving interface or putting the interface in a blocking state (i.e., the interface blocks specific frames). In some embodiments, the layer-2 network is a fabric switch, such as an Ethernet fabric switch or a virtual cluster switch (VCS). In an Ethernet fabric switch, any number of switches coupled in an arbitrary topology may logically operate as a single switch. Any new switch may join or leave the fabric switch in "plug-and-play" mode without any manual configuration. In some embodiments, a respective switch in the Ethernet fabric switch is a Transparent Interconnection of Lots of Links (TRILL) routing bridge (RBridge).

In some embodiments, a switch periodically transmits a loop-detection multicast frame for detecting the loop. If the switch is a fabric switch, the frame is sent via the edge interfaces (i.e., interfaces connecting end devices). For any other switches coupled to the (fabric) switch, this frame is a regular multicast frame. Upon receiving this frame, these switches forward the frame via the other interfaces. On the other hand, for the originating switch, or for one of the member switches of the originating fabric switch, the frame is a self-generated loop-detection frame. The originating switch identifies the frame, realizes the existence of a loop, and shuts down the receiving interface or puts the interface in a blocking state. In some embodiments, the loop-detection multicast frame includes a unique pre-defined value that identifies the (fabric) switch. The switch identifies the frame as self-generated by recognizing the unique value in the frame.

Although the present disclosure is presented using examples based on the layer-2 communication protocol, embodiments of the present invention are not limited to layer-2 networks. Embodiments of the present invention are relevant to any networking protocol which requires a loop-free network topology. In this disclosure, the term "layer-2 network" is used in a generic sense, and can refer to any networking layer, sub-layer, or a combination of networking layers below layer-3 (e.g., the network layer in the Internet protocol stack).

The term "RBridge" refers to routing bridges, which are bridges implementing the TRILL protocol as described in IETF Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "end device" can refer to a host machine, a conventional layer-2 switch, or any other type of network device. Additionally, an end device can be coupled to other switches or hosts further away from a layer-2 network. An end device can also be an aggregation point for a number of network devices to enter the layer-2 network.

The terms "interface" and "port" are used interchangeably. The term "edge interface" refers to an interface on a fabric switch which exchanges data frames with a network device outside of the fabric switch (i.e., an edge interface is not used for exchanging data frames with another member switch of a fabric switch). In a generic sense, the term "interface" can refer to any interface of a switch, including an "edge interface." The term "TRILL interface" refers to an interface which sends/receives data frames encapsulated with a TRILL header and outer MAC header.

The term "switch identifier" refers to a group of bits that can be used to identify a switch. If a switch is an RBridge, the switch identifier can be referred to as an "RBridge identifier." Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term and is not limited to any bit format, and can refer to any format that can identify a switch. The term "RBridge identifier" is also used in a generic sense and is not limited to any bit format, and can refer to "RBridge ID" or "RBridge nickname" or any other format that can identify an RBridge.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "loop" is used in a generic sense, and it can refer to any number of standalone and fabric switches coupled to each other in such a way that at least one of the switches may receive a frame previously originated from the same switch. The term "external loop" refers to a network loop formed based on the external connectivity of a switch. For a fabric switch, an external loop is formed by the edge interfaces. For using in a generic sense, the terms "external loop" and "loop" are used interchangeably. The term "loop breaking" refers to disabling an interface or a link between two switches belonging to a loop in so that the loop does not exist any longer.

The term "Ethernet fabric switch" or "VCS" refers to a number of interconnected physical switches which form a single, scalable logical switch. In a fabric switch, any number of switches can be connected in an arbitrary topology and the entire group of switches function together as one single, logical switch.

This feature makes it possible to use many smaller, inexpensive switches to construct a large fabric switch, which can be viewed as a single logical switch externally.

Network Architecture

FIG. 1 illustrates external-loop detection in an exemplary network, in accordance with an embodiment of the present invention. As illustrated in FIG. 1, fabric switches 102, 104, and 106, and standalone switch 142 are coupled to each other in a layer-2 network 100 (e.g. Ethernet). In some embodiments, switch 142 can operate as a fabric switch by itself. Fabric switch 102 includes switches 112, 114, and 116. Similarly, fabric switch 104 includes switches 122, 124, 126, and 128, and fabric switch 106 includes switches 132, 134, 136, and 138. In some embodiments, all member switches of fabric switches 102, 104, and 106 are RBridges and coupled to each other within the fabric switch via TRILL protocol. In this example, fabric switches 102, 104, and 106 are coupled to each other in a ring topology, and standalone switch 142 is coupled to switches 114 and 116 of fabric switch 102.

During operation, member switch 112 of fabric switch 102 creates a loop-detection multicast frame 152 containing a unique pre-defined value that identifies fabric switch 102. Switch 112 sends frame 152 via a local edge interface to member switch 122 of fabric switch 104. Upon receiving frame 152, switch 122 examines the unique pre-defined value in the frame and recognizes that the frame has not been originated from fabric switch 104. Because frame 152 is a multicast frame, switch 122 sends the frame via all local edge interfaces and to all other member switches of fabric switch 104. Switch 128 receives frame 152 and forwards the frame via all local edge interfaces. Member switch 134 of fabric switch 106, in turn, receives frame 152, recognizes that the frame has not been originated from fabric switch 106, and sends frame 152 to all other member switches. Switch 132 then receives frame 152 and forwards the frame via all local edge interfaces. Member switch 116 of fabric switch 102 then receives frame 152. Upon receiving the frame, switch 116 recognizes frame 152 as originated from fabric switch 102. Switch 116 can identify frame 152 as originated from fabric switch 102 by identifying the unique pre-defined value in frame 152 associated with fabric switch 102. Once switch 116 identifies the frame, switch 116 recognizes the existence of an external loop for fabric switch 102. Switch 116 then shuts down the interface which has received frame 152 to break the loop.

Note that other member switches 114 and 116 also send loop-detection frames out of their respective edge interfaces, wherein the loop-detection frames contain the same unique pre-defined value associated with fabric switch 102. That is, the predefined value is specific to and uniquely identifies fabric switch 102. Any member switch of fabric switch 102, thereby, can identify the frame to be originated from fabric switch 102. For example, member switch 116 of fabric switch 102 sends loop-detection frame 156 to switch 142. Upon receiving frame 156, switch 142 forwards frame 156 via all local edge interfaces. Subsequently, member switch 114 of fabric switch 102 receives frame 156 and detects a loop. Switch 114 then shuts down the interface which has received frame 156 to break the loop. Switch 142 can also be configured to send a loop-detection frame 182 to fabric switch 102 via switch 114 and subsequently receive the frame back via member switch 116 of fabric switch 102. Upon receiving frame 182, switch 142 can shut down the interface which has received frame 182 to break the loop. Note that switch 142 can also be a fabric switch.

Isolation Prevention

Figure 2A:
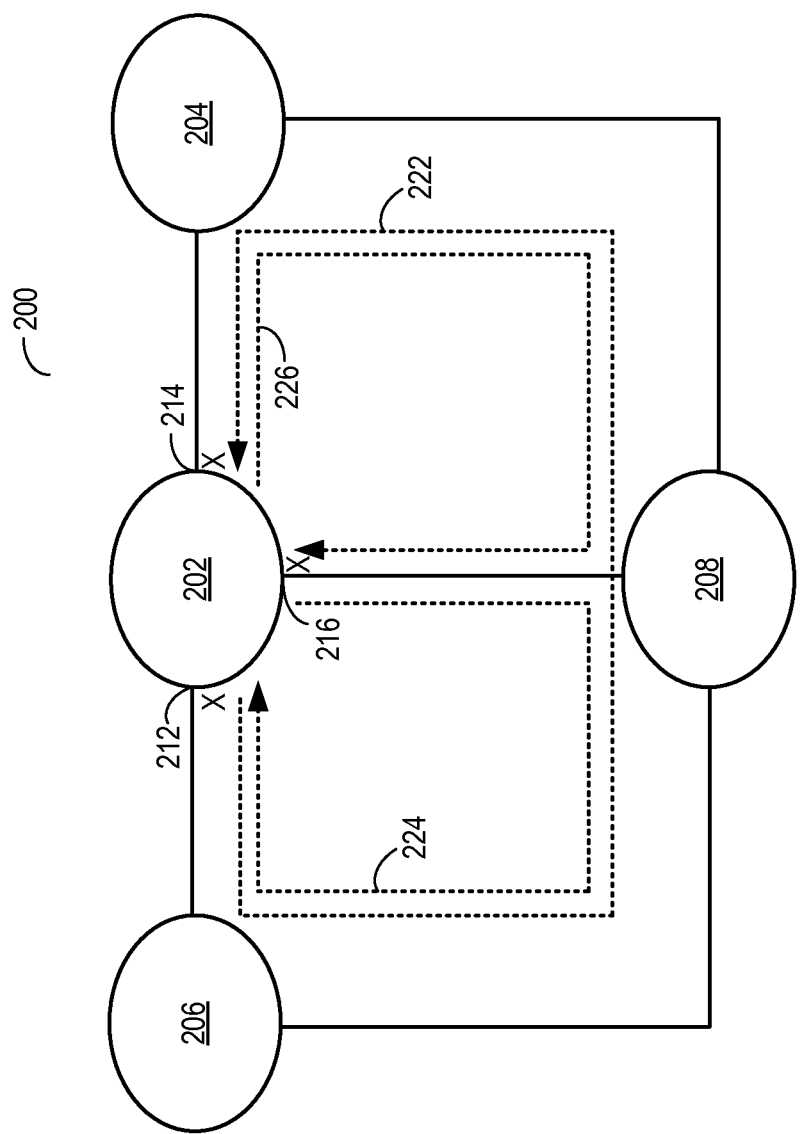
FIG. 2A illustrates an exemplary isolation of a switch in a network while breaking an external loop.

In layer-2 network 100, a respective switch has multiple interfaces coupling to multiple other switches. These interfaces may receive loop-detection frames transmitted by another interface of the switch at the same time. Consequently, the switch may detect a loop at a respective interface and shut down the interfaces. For example, to break a loop, fabric switch 104 in network 100 can shut down the interfaces that couple fabric switch 104 to neighbor fabric switches 102 and 106. Consequently, fabric switch 104 becomes isolated from rest of the network. FIG. 2A illustrates an exemplary isolation of a switch in a network while breaking an external loop. In this example, switches 202, 204, 206, and 208 are coupled to each other in layer-2 network 200. A respective switch in network 200 can be a fabric switch or a standalone switch.

During operation, switch 202 sends a loop-detection frame via interface 212. The frame circles network 200 in loop 222 via switches 206, 208, and 204. Switch 202 receives the frame through interface 214. While sending the loop-detection frame via interface 212, switch 202 sends another loop-detection frame via interfaces 214 which circles network 200 in loop 226. Switch 202 receives this frame through interface 216. Similarly, switch 202 sends another loop-detection frame via interfaces 216 which circles network 200 in loop 224 and receives the frame through interface 212. Upon receiving these frames, switch 202 detects a respective loop at interfaces 212, 214, and 216. In response, switch 202 shuts down interfaces 214, 212, and 216, respectively (denoted with a cross). As a result, switch 202 becomes isolated from the rest of the network.

Figure 2B:
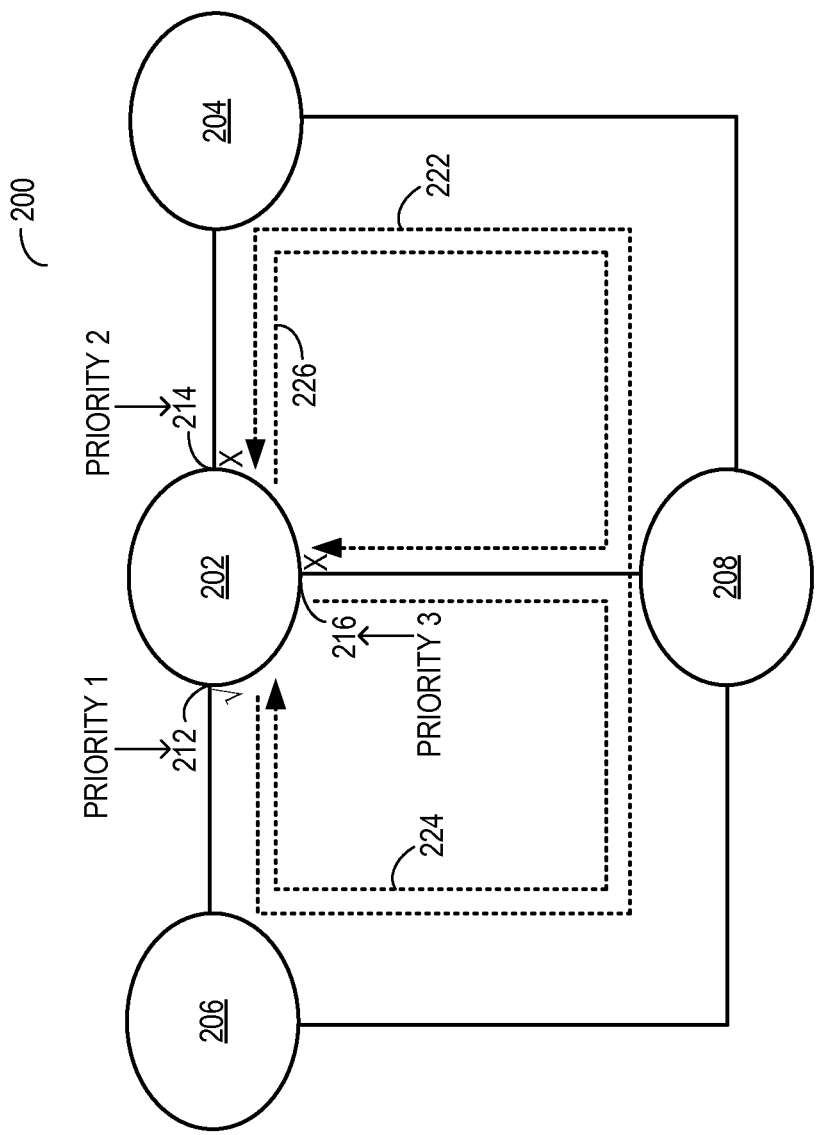
FIG. 2B illustrates how interface priorities prevent isolation of a switch in a network while breaking an external loop, in accordance with an embodiment of the present invention.

In order to prevent such isolation, in some embodiments, a respective interface can be assigned a configurable unique value, called an interface priority value, as a tie breaker. FIG. 2B illustrates how interface priorities prevent isolation of a switch in a network while breaking an external loop, in accordance with an embodiment of the present invention. All components in FIG. 2B are the same as in FIG. 2A, so the same numerals are used to denote them. A respective interface in switch 202 is configured with an interface priority. In this example, interfaces 212, 214, and 216 are assigned interface priority values of 1, 2, and 3, respectively. When switch 202 sends a loop-detection frame via interfaces 212, 214, and 216, corresponding interface priority values of 1, 2, and 3 are included in the frame, respectively. Upon detecting a loop, switch 202 compares the interface priorities of the originating and receiving interfaces and shuts down the interface with a higher or lower priority value. Note that, in a network, one switch can shut down the interface with a higher interface priority value between the originating and receiving interfaces while another switch can shut down the interface with the lowest interface priority value.

In the example in FIG. 2B, during operation, switch 202 sends a loop-detection frame via interface 212 and receives the frame through interface 214. Upon receiving the frame, switch 202 detects loop 222 and retrieves the interface priority value of the originating interface 212 from the frame. Switch 202 then compares the value with the interface priority value of the receiving interface 214. In this example, switch 202 shuts down interface 214 to break loop 222 because interface 214 is configured with a higher interface priority value. Similarly, switch 202 sends another loop-detection frame via interface 214, receives the frame through interface 216, and detects loop 226. Because interface 216 is configured with a higher interface priority value than interface 214, switch 202 shuts down interface 216 and breaks loop 226. In another embodiment, switch 202 can shut down interface 214 to break loop 226 because interface 216 has a higher interface priority value than interface 214. Switch 202 also receives a loop-detection frame originating from interface 216 through interface 212 and detects loop 224. Switch 202 then compares the priority value of the originating interface 216 with the priority value of the receiving interface 212. Because interface 212 is configured with a lower interface priority value, switch 202 does not shut down interface 212 (denoted with a tick/check mark). As a result, the loops in network 200 are broken without isolating switch 202.

Note that, this tie-breaking procedure is specific to a respective switch in network 200 and is irrelevant to any other switch. For example, when switch 204 receives a loop-detection frame from switch 202, switch 202 simply forwards the frame without examining the priority value in the frame. Also note that due to erroneous configurations, multiple interfaces of switch 202 can have the same interface priority value. For example, if the priority value of interface 212 is the same as interface 216, interface identifiers of interfaces 212 and 216 can be used as a tie breaker to break loop 224. If switch 202 is a fabric switch, an interface identifier can include a switch identifier of the corresponding member switch and an interface index associated with the interface. In some embodiments, the switch identifier can be a TRILL RBridge identifier. If the switch is a standalone switch, the switch identifier can be the interface index.

Figure 3A:
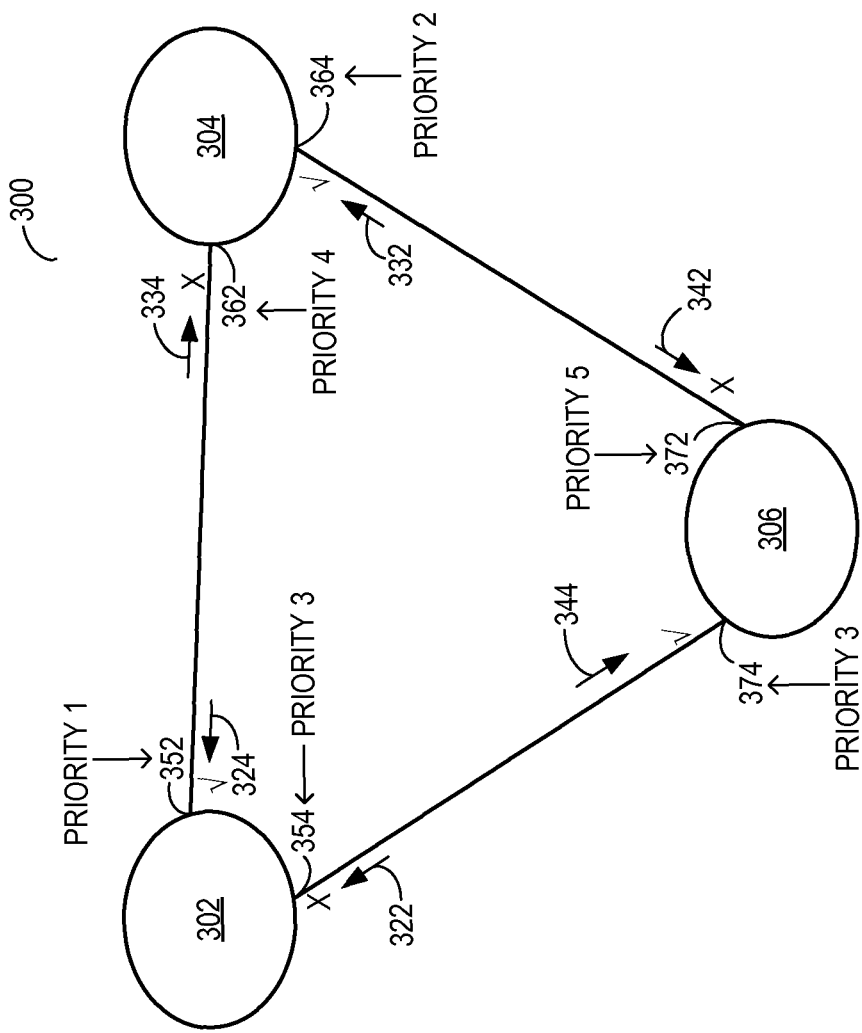
FIG. 3A illustrates an exemplary decoupling of switches in a network while breaking an external loop, in accordance with an embodiment of the present invention.

In network 200, switches 202, 208, and 206 form loop 224. If a respective switch in loop 224 shuts down the interface that couples to the next switch in loop 224, switch 206 can become decoupled. FIG. 3A illustrates an exemplary decoupling of switches in a network while breaking an external loop, in accordance with an embodiment of the present invention. In this example, switches 302, 304, and 306 are coupled to each other in layer-2 network 300. A respective switch in network 300 can be a fabric switch or a standalone switch. Interfaces 352 and 354 of switch 302, interfaces 362 and 364 of switch 304, and interfaces 372 and 374 of switch 306 are configured with interface priority values of 1, 3, 4, 2, 5, and 3, respectively. In some embodiments, upon detecting a loop, a respective switch in network 300 shuts down the interface with a higher priority value. However, the switch can also shut down the interfaces with a lower priority value, depending on how the switch is configured.

During operation, switch 302 sends loop-detection frames 322 and 324 via interfaces 352 and 354, respectively, and receives these frames via interfaces 354 and 352, respectively. Because interface 354 has a higher interface priority value, switch 302 shuts down interface 354 (denoted with a cross). Similarly, switch 304 receives loop-detection frames 332 and 334 via interfaces 364 and 362, and shuts down interface 362 for its higher interface priority value. Switch 306 receives loop-detection frames 342 and 344 via interfaces 372 and 374, and shuts down interface 372 for its higher interface priority value. As a result, a respective switch in network 300 becomes decoupled from its neighbor switches. For example, though switch 302 keeps interface 352 active (denoted with a tick/check mark), the corresponding interface of switch 304, interface 362, is shut down (denoted with a cross). As a result, switch 302 becomes decoupled from switch 304. In this way, a respective switch in network 300 becomes decoupled from its neighbor switches.

Figure 3B:
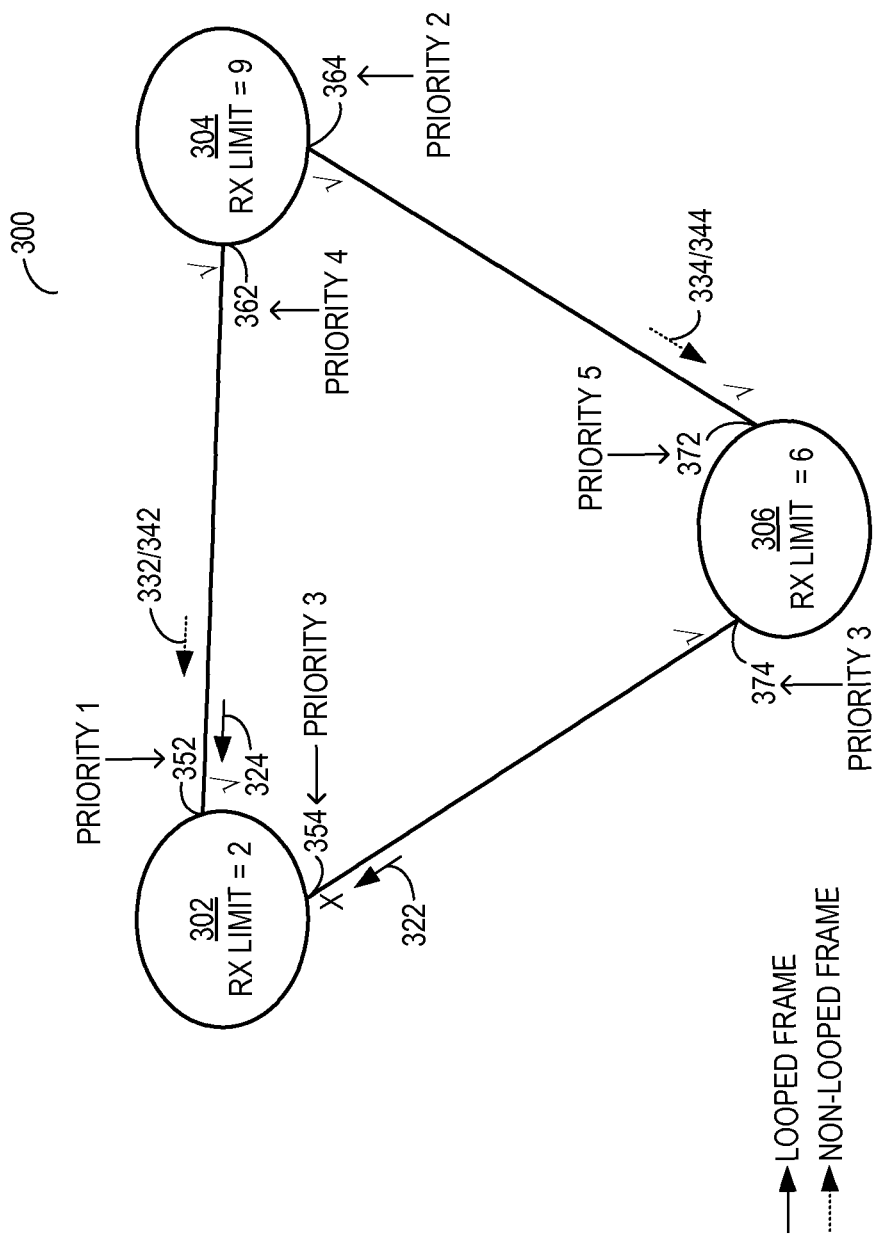
FIG. 3B illustrates how receiving-limit threshold prevents decoupling of switches in a network while breaking an external loop, in accordance with an embodiment of the present invention.

Switches in 300 are decoupled because a respective switch in a loop detects the same loop at the same time and shuts down an interface to break the loop. If one of the switches, say switch 302, in network 300 can detect the loop earlier than the other switches, switch 302 can break the loop before switches 304 and 306 can detect the loop and shut down their interfaces. A respective switch in network 300 can be configured with a unique receiving limit. A switch in network 300 detects a loop and shuts down an interface only when the interface receives more than the receiving limit number of self-generated loop-detection frame. FIG. 3B illustrates how receiving-limit threshold prevents decoupling of switches in a network while breaking an external loop, in accordance with an embodiment of the present invention. All components in FIG. 3B are the same as in FIG. 3A, so the same numerals are used to denote them. A respective switch in network 300 is configured with a unique RX-limit. In this example, RX-limits for switches 302, 304, and 306 are set to 2, 9, and 6, respectively. An interface of switch 302, 304, or 306 detects a loop and shuts down only when the interface receives more than the RX-limit number of self-generated loop-detection frame. For example, interface 352 of switch 302 detects a loop and shuts down only when interface 352 receives loop-detection frame 322 more than 2 times. Note that switch 302 may not keep track of the number of times frame 324 is received through interface 352 because frame 324 is originated from an interface with lower priority value than interface 352.

Because switches 304 and 306 have higher RX-limit values, switch 302 reaches the RX-limit value before switches 304 and 306, detects the loop, and shuts down interface 354 to break the loop. In other words, because RX-limit values of switches 302, 304, and 306 are sufficiently different, even when these switches receives simultaneous loop-breaking frames, eventually switch 302 breaks the loop before switches 304 and 306 reach their respective RX-limit value. When the loop is broken, switches 304 and 306 do not receive any more self-generated loop-breaking frame. For example, when switch 302 shuts down interface 354 to break the loop, the link between switches 302 and 306 becomes inactive. As a result, switch 306 cannot forward frames 334 and 344 to switch 302, and switch 302 cannot forward frames 332 and 342 to switch 306. Switches 304 and 306 then do not receive their respective loop-breaking frame any longer and their respective RX-limit is not reached. In this way, RX-limit prevents decoupling of switches in a layer-2 network.

Misconfigured Link Aggregation

Figure 4:
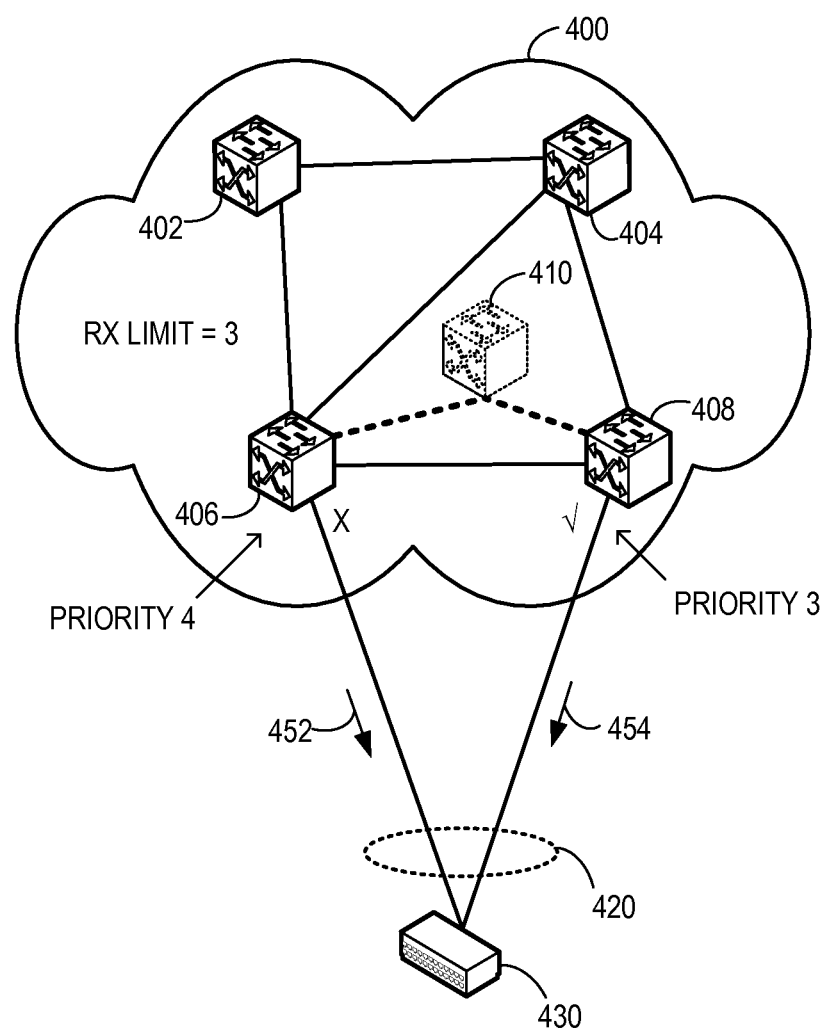
FIG. 4 illustrates breaking a loop caused by an exemplary erroneous link-aggregation configuration, in accordance with an embodiment of the present invention.

An end-device coupled to a fabric switch can be multi-homed (i.e., can be coupled to the fabric switch via multiple links, optionally with multiple member switches). When an end-device is coupled to multiple member switches via multiple links, these links can be aggregated to one virtual trunked link. However, if such a virtual link aggregation is not properly configured, a loop can be formed between the end device and the member switches of the fabric switch. FIG. 4 illustrates breaking a loop caused by an exemplary erroneous link-aggregation configuration, in accordance with an embodiment of the present invention. Fabric switch 400 includes member switches 402, 404, 406, and 408. End device 430 is coupled to member switches 406 and 408 with aggregated link 420. In this example, end device 430 is a conventional layer-2 switch. In some embodiments, fabric switch 400 can be a Ethernet fabric switch and its member switches can be TRILL RBridges.

When configured correctly, switches 406 and 408 can be configured to operate in a special "trunked" mode for end device 430. End device 430 view switches 406 and 408 as a common virtual switch 410. Multi-homed end device 430 is considered to be logically coupled to virtual switch 410 via logical trunked link 420. Also, virtual switch 410 is considered to be logically coupled to both switches 406 and 408, optionally with zero-cost links (also represented by dotted lines). Operation of virtual switch for multi-homed end devices is specified in U.S. patent application Ser. No. 12/725,249, entitled "Redundant Host Connection in a Routed Network," the disclosure of which is incorporated herein in its entirety.

However, if trunked link 420 and virtual switch 410 are not properly configured, end device 430 and to fabric switch 400 can form an external loop. To detect and break the loop, switches 406 and 408 send loop-detection frames 452 and 454 via their respective interfaces. Upon receiving the frames, end device 430 forwards frames 452 and 454 to switches 408 and 406, respectively. In this example, fabric switch 400 is configured with an RX-limit of 3, and the interfaces on switches 406 and 408 are configured with interface priority values of 4 and 3, respectively. As a result, when switch 406 receives frame 454 for more than 3 times, switch 406 shuts down the receiving interface (i.e., the interface with a lower interface-priority value) and breaks the loop. In this way, loops created due to misconfigured virtual link aggregation is detected and broken.

Loop Detection for VLAN

A switch can send a loop-detection frame for a respective interface of the switch or for a respective virtual local area network (VLAN) the switch is configured for. If the switches in a network are configured for different VLANs, they can form VLAN-specific loops. When a switch sends a loop-detection frame for a respective VLAN, a receiving interface on that switch can put the interface in a blocking state for the VLAN (i.e., can stop receiving frames for that particular VLAN) instead of shutting the interface down. In this way, the interface is not shut down for all VLANs and continues receiving all other frames for the VLANs that may not have a loop.

Figure 5:
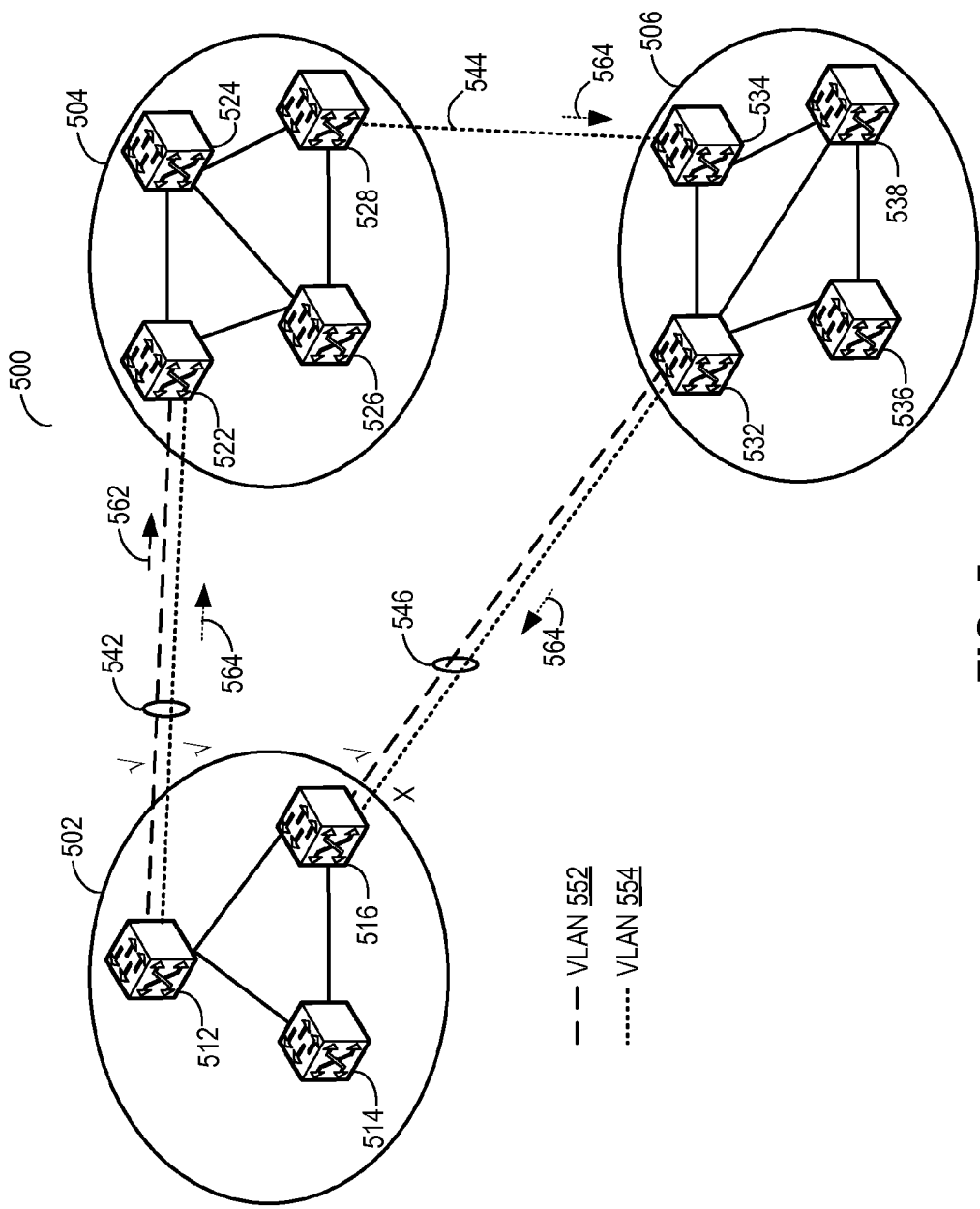
FIG. 5 illustrates breaking a loop based on virtual local area network (VLANs) in an exemplary network, in accordance with an embodiment of the present invention.

FIG. 5 illustrates breaking a loop based on VLANs in an exemplary network, in accordance with an embodiment of the present invention. Fabric switches 502, 504, and 506 are coupled to each other in a layer-2 network 500 (e.g. Ethernet). Fabric switch 502 includes switches 512, 514, and 516. Similarly, fabric switch 504 includes switches 522, 524, 526, and 528, and fabric switch 506 includes switches 532, 534, 536, and 538. In some embodiments, all member switches of fabric switches 502, 504, and 506 are RBridges and coupled to each other within the respective fabric switch via TRILL protocol. In this example, switches 512, 522, 532, and 516 are configured with VLAN 552 (denoted with dashed lines), and switches 512, 522, 528, 534, 532, and 516 are configured with VLAN 554 (denoted with dotted lines). Consequently, links 542 and 546 carry frames for VLANs 552 and 554 while link 544 carries frames for only VLAN 554.

During operation, member switch 512 of fabric switch 502 creates loop-detection frames 562 and 564 associated with VLAN 552 and 554, respectively, and inserts a unique pre-defined value identifying fabric switch 502 into frames 562 and 564. Switch 512 then sends frames 562 and 564 via link 542. Switch 522 of fabric switch 504 receives frames 562 and 564. Because switch 528 is configured with VLAN 554 and not with VLAN 552, switch 522 forwards only frame 564 to switch 528. Switch 528 then forwards frame 564 to switch 534 of fabric switch 506 via link 544. Upon receiving the frame, switch 534 forwards frame 564 to all other switches in fabric switch 506 that are configured with VLAN 554. Switch 532 receives frame 564 and forwards the frame to switch 516 via link 546.

Upon receiving frame 564, switch 516 recognizes frame 564 to be originated from fabric switch 502 and detects a loop for fabric switch 502. Switch 516 also identifies frame 564 to be associated with VLAN 554 based on a VLAN identifier of frame 564. Switch 516 then puts the receiving interface in a blocking mode for VLAN 554 (denoted by a cross), wherein all frames associated with VLAN 554 are dropped by the receiving interface. In this way, the interface continues to receive and process frames associated with other VLANs, such as VLAN 552, via link 546. Because frame 564 loops back to fabric switch 502, switch 502 detects that fabric switch 502, 504, and 506 are coupled to each other in a loop in VLAN 554. At the same time, because frame 562 does not loop back to fabric switch 502, no loop is detected for VLAN 552.

Loop Detection Process

Figure 6A:
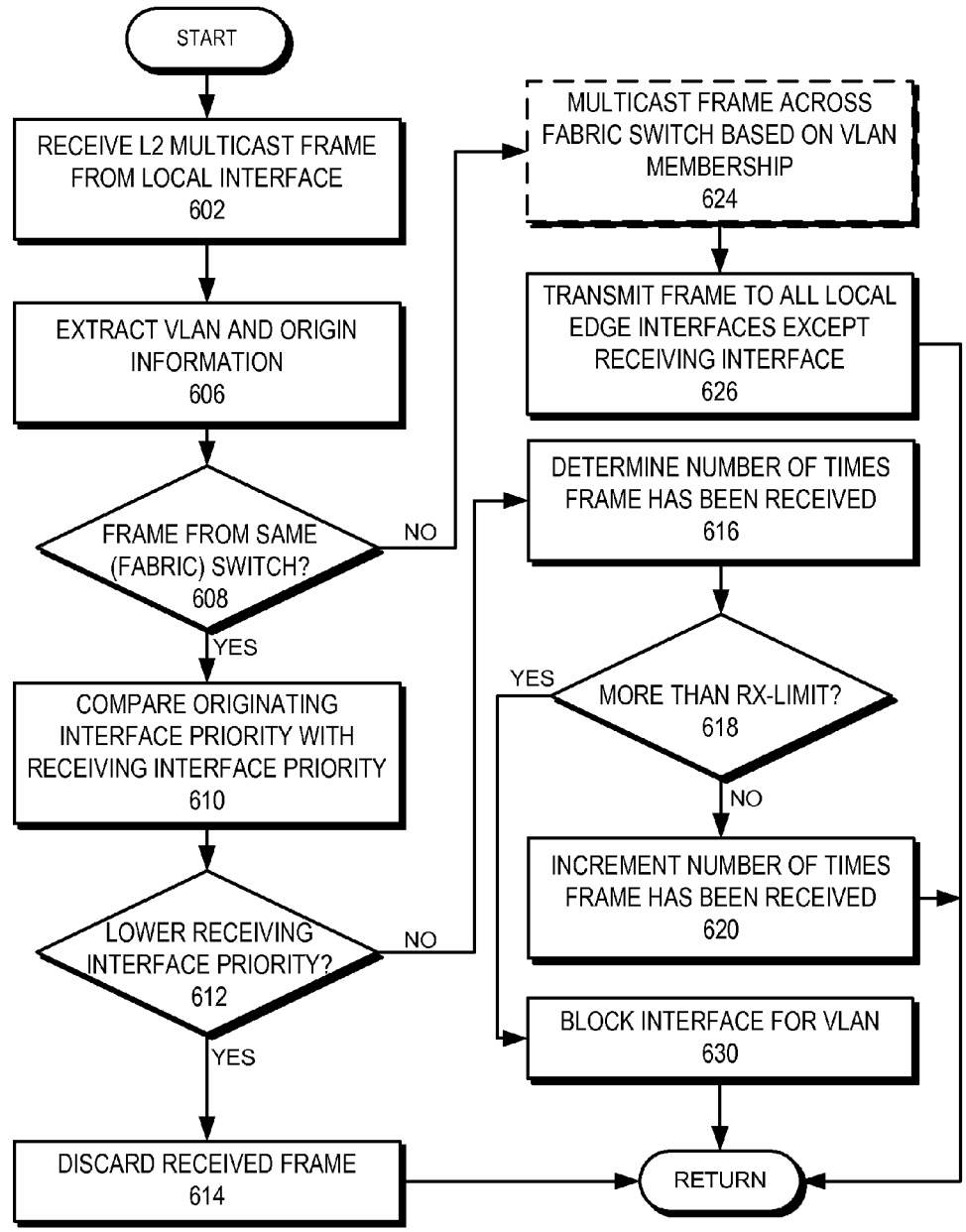
FIG. 6A presents a flowchart illustrating the process of a (fabric) switch detecting and breaking an external loop, in accordance with an embodiment of the present invention.

A respective switch in a network can periodically send a loop-detection frame out of the local interfaces and can detect an external loop upon receiving the frame. FIG. 6A presents a flowchart illustrating the process of a (fabric) switch detecting and breaking an external loop, in accordance with an embodiment of the present invention. Upon receiving a layer-2 multicast frame via a local interface (operation 602), the switch the switch extracts the VLAN identifier and origin information (operation 606). The origin information can include a unique pre-defined value that identifies the originating (fabric) switch and an interface priority value associated with the originating interface. In some embodiments, the unique pre-defined value can be the destination address of the frame which can be a unique layer-2 multicast address of a switch. The unique layer-2 multicast address can be constructed by setting the multicast bit to 1 of the layer-2 address—which is unique—of a switch. Because the frame is a multicast frame, no switch in the network learns the address for local layer-2 forwarding table, and the address remains unique while not being used for forwarding. The switch then checks whether the frame is originated from the same (fabric) switch (operation 608) by comparing the frame's unique value with the switch's own value. If the frame is not originated from the same switch, the frame is a frame originated from another switch. If the switch is a member of a fabric switch, the switch multicasts the frame to all other member switches of the fabric switch that belongs to the VLAN (operation 624). The switch transmits the frame via all local interfaces except the receiving interface (operation 626).

If the frame is originated from the same (fabric) switch (operation 608), the switch compares the interface priority value of the originating interface with the priority value of the receiving interface (operation 610). If the priority value of the receiving interface is lower (operation 612), the switch discards the frame (operation 614). In some embodiments, the switch can discard the frame if the priority value of the receiving interface is higher. If the priority value of the receiving interface is not lower, the switch determines the number of times the frame has been received (operation 616) and checks whether this count number is greater than the RX-limit of the (fabric) switch (operation 618). If not, the switch increments this count number (operation 620). Otherwise, the switch puts the interface in a blocking state for the VLAN (i.e., the switch stops receiving all frames belonging to the VLAN) (operation 630).

Figure 6B:
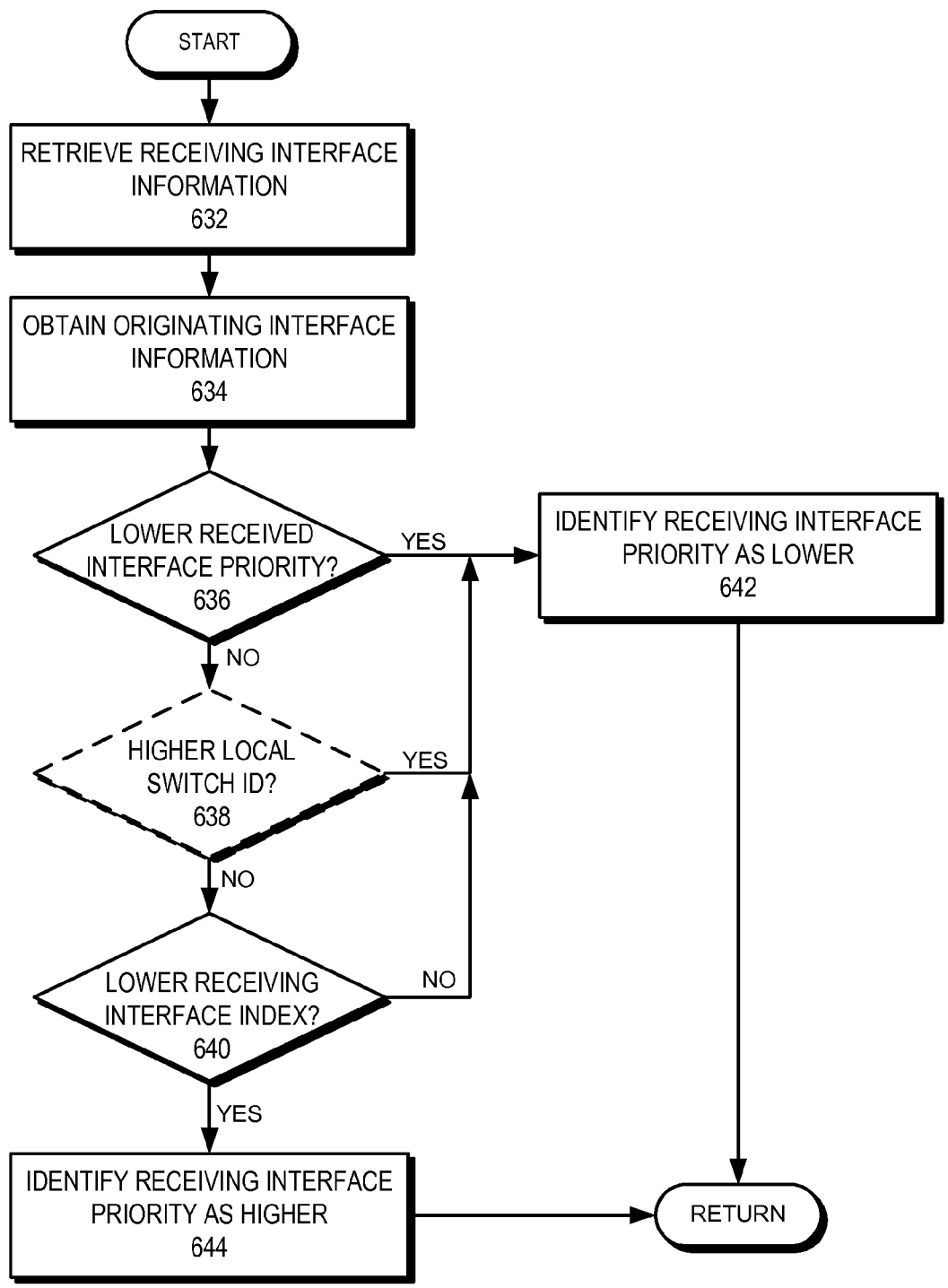
FIG. 6B presents a flowchart illustrating the process of a (fabric) switch comparing interface priorities, in accordance with an embodiment of the present invention.

Due to erroneous configurations, a plurality of interfaces of a switch can have the same interface priority value. If the priority value of two interfaces of the switch has the same priority value, their respective interface identifiers can be used as a tie breaker for breaking a loop. If the switch is a fabric switch, an interface identifier can include a switch identifier of the corresponding member switch and an interface index associated with the interface. Otherwise, the switch identifier can be the interface index. FIG. 6B presents a flowchart illustrating the process of a (fabric) switch comparing interface priorities, in accordance with an embodiment of the present invention. This process corresponds to operation 610 of FIG. 6A.

The switch first retrieves the receiving interface information (operation 632). Interface information can include an interface priority, an interface index, and optionally, a switch index. The switch also obtains the originating interface information from the received frame (operation 634). The switch then checks whether the interface priority of the receiving interface is lower than the interface priority of the originating interface (operation 636). If not, and if the switch is a member of a fabric switch, the switch checks whether the switch identifier of the local member switch has a higher value than the originating member switch (operation 638). In some embodiments, the fabric switch can be a VCS, and the switch identifier can be an RBridge identifier.

If the local member switch does not have a higher switch identifier value or the switch is not a member of a fabric switch, the switch checks whether an interface index of the receiving interface has a lower value than the originating interface (operation 640). If so, the switch identifies the interface priority of the receiving interface as higher than the originating interface (operation 644). If the interface priority of the receiving interface is lower (operation 636), if the switch identifier of the local member switch is higher (operation 638), or if the interface index of the receiving port is lower (operation 640), the switch identifies the interface priority of the receiving interface as lower than the originating interface (operation 642). Note that if the receiving interface and the originating interface have the same interface priority, switch identifier, and interface index, the receiving interface is the originating interface. This indicates the existence of an external loop via the interface, and the interface should be shut down.

Exemplary Switch System

Figure 7:
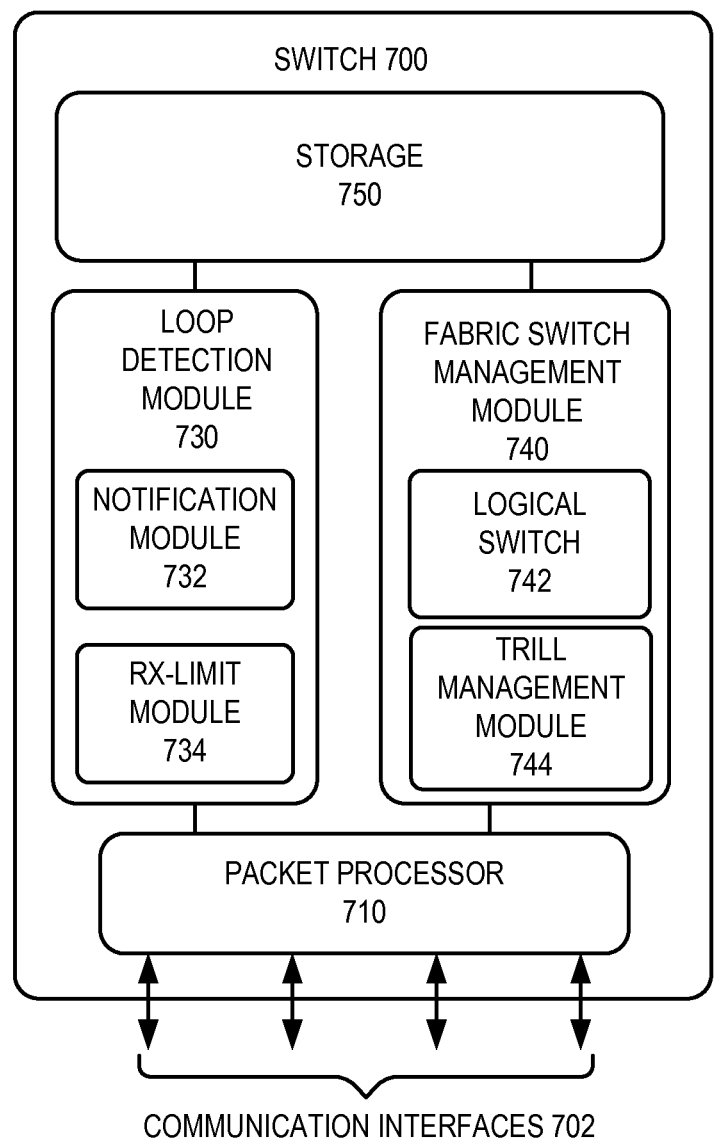
FIG. 7 illustrates an exemplary architecture of a switch, in accordance with an embodiment of the present invention.

FIG. 7 illustrates an exemplary switch, in accordance with an embodiment of the present invention. In this example, a switch 700 includes a number of communication interfaces 702, a loop detection module 730, a packet processor 710, and a storage 750. Loop detection module 730 includes a notification module 732 and an RX-limit module 734. Packet processor 710 extracts and processes header information from the received frames.

In some embodiments, switch 700 may maintain a membership in a fabric switch, wherein switch 700 also includes a fabric switch management module 740 and a logical switch 742 representing the fabric switch. Fabric switch management module 740 maintains a configuration database in storage 750 that maintains the configuration state of every switch within the fabric switch. Fabric switch management module 740 maintains the state of logical switch 742, which is used to join other switches. In some embodiments, logical switch 742 can be configured to operate in conjunction with packet processor 710 as a logical Ethernet switch. Under such a scenario, communication interfaces 702 can include inter-switch communication channels for communication within a fabric switch. This inter-switch communication channel can be implemented via a regular communication port and based on any open or proprietary format. Communication interfaces 702 can include one or more TRILL interfaces capable of receiving frames encapsulated in a TRILL header. TRILL management module 744 processes these frames.

During operation, notification module 732 periodically creates a loop-detection frame associated with switch 700. Notification module 732 can include a unique value identifying switch 700 and optionally VLAN information associated with the switch in the frame. Packet processor 710 encapsulates the frame in a layer-2 header (and optionally in a TRILL header, in conjunction with TRILL management module 744) and sends the frame via one of the communication interfaces 702. When switch 700 receives a loop-detection frame, packet processor 710 removes the encapsulations of the received frame. Loop detection module 730 checks whether the frame has been originated from switch 700 by checking the unique value.

RX-limit module 734 checks the number of times a frame originated from switch 700 has been received. If switch 700 is a member of a fabric switch, RX-limit module 734 checks the number of times a frame originated from the same fabric switch has been received. RX-limit module 734 can maintain a counter for this purpose. In some embodiments, RX-limit module 734 maintains the counter for a respective VLAN associated with switch 700. Upon detecting a loop, loop detection module 730 can shut down the receiving interface. Alternatively, loop detection module 730 can put the interface in a blocking state for a VLAN for which a loop has been detected, as described in conjunction with FIG. 6A.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch, a method and a system for efficiently detecting edge loops in layer-2 networks. In one embodiment, the switch includes a loop detection mechanism and an interface control mechanism. The loop detection mechanism identifies a layer-2 frame, wherein the frame contains a loop identifier, identifying information of a first interface, and a first priority value associated with the first interface. The interface control mechanism blocks a second interface based on a comparison between a second priority value associated with the second interface and the first priority value.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   a receiving interface adapted to identify a loop-detection frame which includes a first identifier identifying an originating switch of the loop-detection frame;
   a loop-detection module adapted to detect a loop based on a match between the first identifier identifying the originating switch and a fabric identifier identifying an Ethernet fabric switch, wherein the Ethernet fabric switch comprises a number of physical switches and functions as a single switch, wherein the Ethernet fabric switch is distinct from a virtual local area network (VLAN) and can accommodate multiple VLANs, and wherein the switch comprising the receiving interface is a member of the Ethernet fabric switch; and
   an interface control module adapted to preclude, in response to detecting the loop, from forwarding frames corresponding to the loop.

2. The switch of claim 1, wherein the detected loop is in a multi-switch link aggregation spanning the switch and the originating switch.

3. The switch of claim 1, wherein the fabric identifier is associated with a respective switch of the Ethernet fabric switch.

4. The switch of claim 1, wherein the loop-detection frame is a layer-2 multicast frame.

5. The switch of claim 1, wherein the interface control module is further adapted to compare a first priority value and a second priority value specified in the loop-detection frame, wherein the first priority value is associated with the receiving interface and the second priority value is associated with an originating interface of the loop-detection frame.

6. The switch of claim 1, wherein the receiving interface is further adapted to identify an originating interface of the loop-detection frame based on a Transparent Interconnection of Lots of Links (TRILL) routing bridge (RBridge) identifier and an interface identifier of the originating interface.

7. The switch of claim 1, wherein the loop-detection frame further includes an identifier of a virtual local area network (VLAN), and
   wherein the detected loop is specific to the VLAN.

8. The switch of claim 1, wherein the loop detection module is further adapted to maintain a counter which indicates a number of times the loop-detection frame has been identified; and
   wherein the interface control module is adapted to preclude from forwarding frames corresponding to the loop further in response to a value of the counter exceeding a threshold value.

9. The switch of claim 1, further comprising a logical switch management module adapted to maintain a membership in the Ethernet fabric switch.

10. A computer-executed method, comprising:
    identifying, by a receiving interface, a loop-detection frame which includes a first identifier identifying an originating switch of the loop-detection frame;
    detecting a loop based on a match between the first identifier identifying the originating switch and a fabric identifying an Ethernet fabric switch, wherein the Ethernet fabric switch comprises a number of physical switches and functions as a single switch, wherein the Ethernet fabric switch is distinct from a virtual local area network (VLAN) and can accommodate multiple VLANs, and wherein a local switch comprising the receiving interface is a member of the Ethernet fabric switch; and
    precluding, in response to detecting the loop, from forwarding frames corresponding to the loop.

11. The method of claim 10, wherein the detected loop is in a multi-switch link aggregation spanning the local switch and the originating switch.

12. The method of claim 10, wherein the fabric identifier is associated with a respective switch of the Ethernet fabric switch.

13. The method of claim 10, wherein the loop-detection frame is a layer-2 multicast frame.

14. The method of claim 10, further comprising comparing a first priority value and a second priority value specified in the loop-detection frame, wherein the first priority value is associated with the receiving interface and the second priority value is associated with an originating interface of the loop-detection frame.

15. The method of claim 10, further comprising identifying an originating interface of the loop-detection frame based on a Transparent Interconnection of Lots of Links (TRILL) routing bridge (RBridge) identifier and an interface identifier of the originating interface.

16. The method of claim 10, wherein the loop-detection frame further includes an identifier of a virtual local area network (VLAN), and
    wherein the detected loop is specific to the VLAN.

17. The method of claim 10, further comprising maintaining a counter which indicates a number of times the loop-detection frame has been identified; and
    precluding from forwarding frames corresponding to the loop further in response to a value of the counter exceeding a threshold value.

18. The method of claim 10, further comprising maintaining a membership in the Ethernet fabric switch.

19. A non-transitory computer-readable storage medium storing instructions that when executed by a computer cause the computer to perform a method for detecting a loop in a computer network, the method comprising:
    identifying, by a receiving interface, a loop-detection frame which includes a first identifier identifying an originating switch of the loop-detection frame;
    detecting a loop based on a match between the first identifier identifying the originating switch and a fabric identifier identifying an Ethernet fabric switch, wherein the Ethernet fabric switch comprises a number of physical switches and functions as a single switch, wherein the Ethernet fabric switch is distinct from a virtual local area network (VLAN) and can accommodate multiple VLANs, and wherein a local switch comprising the receiving interface is a member of the Ethernet fabric switch; and precluding, in response to detecting the loop, from forwarding frames corresponding to the loop.

20. The storage medium of claim 19, wherein the detected loop is in a multi-switch link aggregation spanning the local switch and the originating switch.

21. The storage medium of claim 19, wherein the fabric is associated with a respective switch of the Ethernet fabric switch.

22. The storage medium of claim 19, wherein the loop-detection frame is a layer-2 multicast frame.

23. The storage medium of claim 19, further comprising comparing a first priority value and a second priority value specified in the loop-detection frame, wherein the first priority value is associated with the receiving interface and the second priority value is associated with an originating interface of the loop-detection frame.

24. The storage medium of claim 19, further comprising identifying an originating interface of the loop-detection frame based on a Transparent Interconnection of Lots of Links (TRILL) routing bridge (RBridge) identifier and an interface identifier of the originating interface.

25. The storage medium of claim 19, wherein the loop-detection frame further includes an identifier of a virtual local area network (VLAN), and wherein the detected loop is specific to the VLAN.

26. The storage medium of claim 19, further comprising maintaining a counter which indicates a number of times the loop-detection frame has been identified; and precluding from forwarding frames corresponding to the loop further in response to a value of the counter exceeding a threshold value.

27. The storage medium of claim 19, further comprising maintaining a membership in the Ethernet fabric switch.

* * * * *